Feb. 20, 1934.  W. F. ROCKWELL ET AL  1,948,397
VEHICLE DRIVE AND BRAKING APPARATUS
Filed Sept. 14, 1931
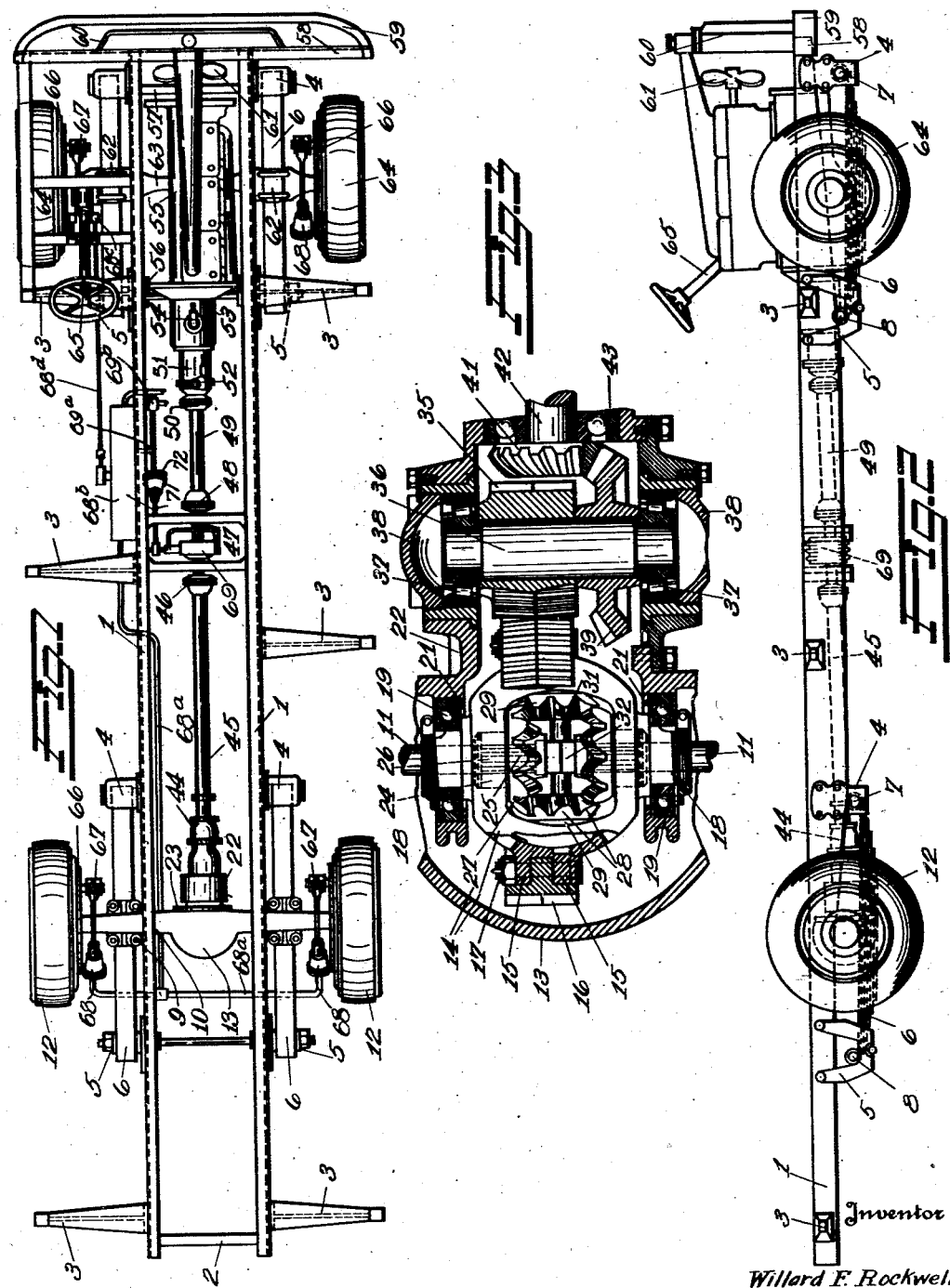
Inventor
Willard F. Rockwell
Herbert W. Alden Patented Feb. 20, 1934

1,948,397

UNITED STATES PATENT OFFICE 1,948,397

VEHICLE DRIVE AND BRAKING APPARATUS

Willard F. Rockwell, Pittsburgh, Pa., and Herbert W. Alden, Detroit, Mich., assignors to The Timken-Detroit Axle Company, Detroit, Mich., a corporation of Ohio Application September 14, 1931
Serial No. 562,772

1 Claim. (Cl. 180—70)

The present invention relates to driving and braking arrangements for motor vehicles and more particularly to improved driving and braking arrangements adapted to minimize skidding hazards upon sudden application of brakes on the driven wheels of a motor vehicle particularly when the engine is disconnected from the wheels.

Our invention is especially useful in vehicles provided with free-wheeling or over-running clutches by operation of which the engine is automatically disconnected from the rear wheels whenever the vehicle tends to drive the wheels in well known manner.

Ease of shift operation together with improvement in riding qualities, economies in gasoline consumption, and saving in wear and tear on the engine, effected by use of free-wheeling or over-running clutches has resulted in widespread adoption of free-wheeling drives or over-running clutches in light motor vehicles, in spite of the recognized danger of sudden application of brakes to the wheels of a vehicle with the engine disconnected therefrom, which automatically occurs when a free-wheeling drive vehicle is stopped from high speed in an emergency. This danger which is aggravated in free-wheeling vehicles due to the automatic clutch operation, exists in the operation of any automobile embodying the usual differential drive axle mechanism when, with brakes improperly adjusted, as is frequently the case in normal vehicle operation, the brakes are suddenly applied with the engine disconnected from the wheels. Under such circumstances, the engine resistance to rotation of the propeller shaft is eliminated and one brake will grip its wheel an instant ahead of the other. In this instant the unbraked wheel is free to turn ahead of the braked wheel with the result that the rear end of the vehicle tends to go into a dangerous skid. In a free-wheeling automobile the disconnection of the engine is automatic during emergency brake application, while in automobiles not equipped with free-wheeling or over-running clutches it is the practice of average and unskilled drivers to dis-engage the clutch manually thereby disconnecting the engine while applying the brakes to suddenly stop the vehicle. The danger of skidding under such conditions is recognized to be so serious that in many States laws have been passed making it illegal for vehicle operators to coast with the engine disconnected from the wheels, particularly down hills where the danger from skidding is multiplied in event sudden application of brakes becomes necessary to stop the vehicle in an emergency.

The danger of applying the brakes with the vehicle moving at high speed and the engine disconnected from the wheels has been a recognized drawback of free-wheeling drive motor vehicles particularly in hilly country and has limited the application of free-wheeling drives and over-running clutches to the lighter motor vehicles or the pleasure car class. The greater weight of trucks and busses and the dangers of braking such vehicles when coasting at high speed with the engine disconnected have heretofore precluded the application of free-wheeling or over-running clutches thereto.

By providing a novel drive axle and braking arrangement in which even though the braking pressure is unequally applied to the driven wheels, the tendency of the unbraked wheel to run ahead of the braked wheel is checked, we have been able to greatly increase the safety of braking operations with and without the engine disconnected from the wheels, and to safely extend the advantages of free-wheeling drives to commercial vehicles as well as to the pleasure cars.

Accordingly, a primary object of the present invention is to provide novel combination of driving and braking mechanism for motor vehicles which materially reduces the hazards of emergency braking of motor vehicles.

A further object of our invention is to provide novel over-running clutch or free-wheeling drive and braking arrangements for motor vehicles in which the advantages of present free-wheeling drives for motor vehicles are retained while skidding hazard in emergency operation of the brakes while the vehicle is travelling at comparatively high speeds are minimized, thereby materially increasing the safety of operation of such vehicles, and making free-wheeling drives practically feasible and safe for heavy duty trucks and busses.

Further objects of the present invention will appear from the following detailed description of a preferred embodiment thereof, and are defined by the terms of the appended claims.

Referring to the drawing.

Figure 1 is a plan view illustrating a preferred application of our invention to a bus or truck chassis.

Figure 2 is a side view of the chassis shown in Figure 1.

Figure 3 is an enlarged fragmental sectional view showing a preferred embodiment of driving axle differential mechanism utilized in our invention.

As shown in Figures 1 and 2, the main channel members 1 connected by cross members 2 form the main frame of the vehicle. Secured to frame members 1 by riveting or in any suitable manner are members 3 to which the body of the vehicle is secured and by means of which it is supported in well known manner. Suitably secured to frame members 1 are spring brackets 4 and 5 to which vehicle springs 6 are connected by means of the eye bolts 7 and pivoted shackles 8 in well known manner.

Rigidly secured to the rear springs 6 by means of saddles 9 is the load carrying housing of differential drive axle 10. As indicated on Figure 3, axle 10 is provided with a pair of differentially driven axle shafts 11 driving the wheels 12 which support the axle 10 and the rear end of the vehicle. Axle shafts 11 are driven by a novel variable leverage differential mechanism illustrated in Figure 3 which comprises a differential housing 14 provided with flanges 15 to which herringbone spur tooth ring gear 16 is secured by means of bolts 17. Housing 14 is provided with tubular extensions 18 supported for rotation in bearings 19 which in turn are supported in bearing extensions 21 of the front mounting gear carrier 22 of the axle, which in turn is located and secured in position on the axle housing by means of the securing flange 23.

Journaled for rotation in suitable bores formed in housing 14 are hubs 24 of differential side gears 25 provided with splined bores 26, into which the splined ends of the axle shafts 11 slidably fit in well known manner.

Gears 25 are each provided with twelve variable leverage teeth 27 which mesh with the variable leverage pinion teeth 28 of diametrically opposite pinions 29, each pinion 29 being provided with seven teeth. Teeth 27 and 28 of gears 25 and pinions 29 are elongated and generated in such manner and so shaped that the point of contact of the teeth moves alternately inwardly and outwardly along elongated sections of the tooth profile as the gears rotate with relation to each other, so that substantial periodic and alternate variations in leverage ratios of the meshing gears and pinions occur as one of the wheels 12 tends to rotate ahead of the other. As an odd number of teeth is provided in pinions 29, the teeth on opposite sides of the pinions engage with the side gears in such manner that when the leverage ratio between each pinion and one side gear is maximum, the leverage ratio between each pinion and the opposite side gear is a minimum. Also since an even number of teeth is provided in the side gears, the meshing engagement and leverage ratios of diametrically opposite pinions 29 with relation to the side gears will at all times be the same. Leverage variations between pinions 29 and the side gears will occur simultaneously and in phase and unison, and will alternate between the pinions and the opposite side gears of the mechanism. The maintenance of an odd number of teeth on the pinions and an even number of teeth on the side gears is highly important in the mechanism illustrated. If an odd number of teeth is utilized in the side gears the variations of leverage with opposite pinions will not be in phase or unison, and if an even number of teeth is used in the pinions the leverage variations will not alternate between the pinions and opposite side gears, thereby destroying the practical effectiveness of the variable leverage action in checking the tendency of one wheel to rotate rapidly ahead of the other upon uneven application of the wheel brakes.

Pinions 29 are journaled for rotation diametrically opposite each other on shaft or spindle 31 the ends of which are supported in suitable bores formed in the differential housing 14. Side gear spacing members 32 are disposed centrally around shaft 31 and are provided with cylindrical extensions which fit rotatably into bores of the side gears 25.

Ring gear 16 meshes with and is driven by the herringbone spur tooth pinion 35 which is keyed on and driven by cross shaft 36 supported in bearings 37 in the reduction gear carrier or housing 22 of the axle. Bearings 37 are adjustably held in position by means of the cap members 38 in well known manner. Mounted on and driving cross shaft 36 is a bevel gear 39 which meshes with and is driven by the primary bevel pinion 41 in turn mounted on and driven by propeller shaft section 42. Shaft 42 is supported in journals 43 mounted in the gear carrying housing 22 and its outer end is connected by means of universal joint 44 (Figures 1 and 2) to splined telescoping shaft 45, the opposite end of which is connected by means of universal joint 46 to the propeller shaft section 47. Shaft section 47 is suitably journaled in bearings (not shown) supported in the frame cross members 2. The forward end of propeller shaft section 47 is connected by means of universal joint 48, shaft section 49 and universal joint 50 to free-wheeling or over-running clutch mechanism 51 provided with the free-wheeling lock out control operable to prevent the automatic operation of the free-wheeling or over-running clutch mechanism 51 at the will of the operator in well known manner. Free-wheeling or over-running clutch 51 and lock out device 52 may be of any well known type, various types of which are in commercial use and well known in the art.

Automatic clutch mechanism is connected to and driven by variable speed transmission or gear set 53 controlled by shift lever mechanism 54 in well known manner. The transmission 53 together with the free-wheeling clutch 52 is supported from the engine bell housing of engine 55 in which the usual manually controlled clutch controlled by manually operable foot pedal and mechanical connections (not shown) is located in well known manner. Engine 55 drives the variable speed transmission gearing 53 through the manually controlled clutch mechanism and is supported between main frame members 1 by supporting brackets 56 and the supporting cross member 57 secured to frame members 1 in any suitable manner. Supported on the forward end of frame members 1 is end sill 58 and vehicle bumper construction 59 upon which the vehicle cooling radiator 60 is supported adjacent the engine driven fan 61.

Secured to the middle of forward vehicle springs 6 by means of spring saddles 62 is the center drop section of front axle 63 to the ends of which steering wheels 64 are secured for steering movement by means of any suitable steering connection. Steering post 65 is connected by well known suitable steering link constructions (not shown) to wheels 64 for the purpose of steering the vehicle in a manner well known to those skilled in the art.

To provide for braking of the wheels, there are provided suitable wheel brakes 66 of any conventional type actuated by means of the operating rods 67 and the operating hydraulic or pneumatic cylinders 68. Cylinders 68 are simultaneously supplied with operating energy through suitable connections 68a under the control of manually operated mechanisms of any suitable type, for example a control valve mechanism 68b under control of brake pedal 68c through a suitable connecting link or rod 68d as will be understood by those skilled in the art. Propeller shaft brake mechanism 69 of any well known construction operated by rod 71 is provided to retard rotation of propeller shaft section 47. Rod 71 is preferably connected for operation both independently of and simultaneously with the operation of the wheel brake operating rods 67 at the will of the operator by providing an operating cylinder 72 together with a connecting conduit 69a to the control valve mechanism 68b to admit operating fluid simultaneously with the admission of operating pressure to wheel brake cylinders 68, and independently of the admission of fluid to cylinders 68 by an auxiliary valve 69b connected by suitable linkage from lever 69d to a control lever within reach of the operator. This brake arrangement is especially adapted for heavy duty commercial types of vehicles such as trucks and busses equipped with free-wheeling or over-running clutches, and the adjustment of the brakes is such that propeller shaft brake 69 will be applied just prior to or simultaneously with wheel brakes 66. The former effect will be aided if conduit 69a is provided with a slightly larger passage than conduits 68a.

For the lighter types of vehicles such as pleasure cars, a single reduction variable leverage differential axle mechanism is utilized, propeller shaft brake 69 may be completely eliminated, and the wheel brakes may be operated by the usual mechanical or hydraulic brake mechanisms in common use on pleasure cars.

In operation of a vehicle so far described when it is desired to utilize the engine for decelerating purpose, as for example, when descending hills lock out device 52 may be operated in well known manner to lock shaft 49 for rotation with the transmission tail shaft, thereby preventing the automatic disconnection of the driven wheels 12 from the engine when the vehicle is running ahead of the engine. However in normal operation control device 52 is so set that free-wheeling or over-running clutch 51 automatically disconnects the engine when the rear wheels tend to drive the engine.

During normal operation of the vehicle with wheels 12 rotating at equal speeds, pinions 29 will rotate with housing 14 without rotating about shaft 31, and will drive side gears 25 and axle shafts 11 at equal speeds. When the vehicle turns a curve, the usual compensation for the difference in rate of rotation of the axle shafts will occur freely in the usual manner, with pinions 29 rotating slowly on shaft 31.

When however, one of the wheels 12 tends to turn ahead of the other rapidly, as for example, upon sudden uneven application of wheel brakes, causing braking of one wheel momentarily ahead of the other, relative rotation of the pinions 29 and gears 25 will tend to occur, causing alternate leverage variations. With a suitable resistance developed to rotation of housing 14, upon sudden unequal application of brakes 69 on wheels 12, the action of the variable leverage gearing will resist the tendency of the unbraked wheel to turn faster than the braked wheel, thereby substantially reducing the skidding tendency and increasing the safety of the vehicle operation.

With engine 55 connected to the rear wheels when the throttle is closed and the brakes are applied to arrest the vehicle, the drag or resistance of the engine to rotation of the propeller shaft and housing 14 will be ample to permit the variable leverage gearing to function in the manner above set forth to prevent one of the wheels 12 from turning ahead of the other rapidly enough to throw the vehicle into a dangerous skid.

Without the use of propeller shaft brake 69 in a lighter free-wheeling car, as the vehicle slows down suddenly due to closing of the throttle and immediate brake application in an emergency when the skidding hazard is greatest, free-wheeling clutch 51 will immediately disconnect the engine, but the engine will be rotating at high speed due to the inertia of rotating parts, and the velocity of propeller shaft 49 will drop more rapidly than the rotation of the engine. As soon as the speed of rotation of shaft 49 drops back to the speed of rotation of the tail shaft of transmission 53, which will occur practically instantaneously, a free-wheeling or over-running clutch 51 will again connect the propeller shaft 49 to the engine, and thereafter so long as the speed of the propeller shaft tends to drop faster than the engine speed, sufficient resistance to rotation of propeller shaft 49 and the housing 14 will be developed for a sufficient length of time to permit the variable leverage gearing to check any dangerous tendency of one wheel 12 to rotate ahead of the other, and the action is rapid enough to prevent the vehicle from going into a dangerous skid in event of uneven brake application under such conditions.

In lighter vehicles embodying my invention, the resistance imposed on shaft 49 and housing 14, due to the tendency of the speed of the vehicle to drop at a faster rate than the drop in speed of the engine, in emergency braking under conditions where skidding dangers are serious with the conventional free-wheeling vehicles, is sufficient to materially increase the safety of operation of such vehicles with the use of a propeller shaft brake.

However, for maximum safety of operation in all vehicles, and particularly for heavier busses and trucks where the momentum of the vehicle is great, and the dangers of skidding with the engine disconnected from the driving wheels during emergency braking operations, are so great as to have heretofore prevented the adoption of free-wheeling and over-running clutches, and to overcome resistance to free-wheeling drives generally propeller shaft brake 69 should be utilized and adjusted to apply braking pressure to the propeller shaft simultaneously with or an instant before application of wheel brakes 66 to wheel 12. So adjusted the propeller shaft brake will not only impose sufficient instantaneous resistance to rotation of housing 14 to cause the leverage variation of gears 25 and 29 to arrest the tendency of one wheel 12 to rotate ahead of the other dangerously upon uneven application of wheel brakes 66 due to defective adjustment or uneven wear of the wheel brakes in operation, but at the same time the propeller shaft brake will effectively aid in braking wheels 12 and retarding the speed of the vehicle, thereby simultaneously eliminating dangerous skidding tendencies of the vehicle in emergency braking.

Accordingly, the propeller shaft brake supplies the braking effect of the engine now relied upon to aid the wheel brakes in decelerating vehicles of the conventional free-wheeling type during braking operations. The braking effect secured by propeller shaft brake 69 in vehicles embodying my invention accordingly permits the use of existing wheel brake mechanisms designed to utilize the substantial braking effect secured in vehicles of the conventional type by braking application with the engine connected to the rear wheels. This form of invention, accordingly, eliminates the necessity for the redesign of wheel brakes to increase their efficiency due to adoption of free-wheeling or over-running clutches, and permits all of the benefits of free-wheeling drives to be secured in vehicles of all classes and sizes. At the same time, when the brakes are applied, considerably improved braking is secured on the propeller shaft over that which has heretofore been available.

In vehicles equipped with the form of invention embodying the propeller shaft brake arranged for simultaneous operation with the wheel brakes, the necessity for the lock out device 52 on the free-wheeling or over-running clutch is eliminated particularly in the lighter cars, since the sole purpose of the locking devices is to give the vehicle the added safety secured by utilizing the braking resistance of the engine on the propeller shaft on hills and in emergency braking. Retardation of the propeller shaft is more effectively accomplished in my invention by use of the propeller shaft brake than can be accomplished by the use of the engine. Since free-wheeling lock out devices are more or less complicated and troublesome to operate, and require quick action to operate effectively in an emergency, in addition to reducing the cost of the vehicle by eliminating the lock out device and maintenance costs thereof if desired, my invention simplifies the emergency control of free-wheeling cars, a highly important factor in the safe operation of such vehicles.

In addition it will be noted that the form of invention including the improved propeller shaft brake arrangement and variable leverage differential mechanism, if applied to a conventional type of vehicle without the free-wheeling or over-running clutch interposed between the engine and the driven wheels, will materially increase the safety of operation in emergencies when the manual clutch is operated to disengage the engine from the rear wheels when the brakes are suddenly applied.

It will accordingly be seen by those skilled in the art that the present invention while useful in all types of vehicles, is especially desirable in eliminating the present disadvantages of free-wheeling vehicles during deceleration and emergency braking, and materially increasing the safety of operation, permits the safe extension of free wheeling drives to heavier commercial vehicles in which it has heretofore been considered impractical to utilize such drives because of the dangers introduced due to the elimination of the braking effect of the engine in emergency braking conditions.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:—

A vehicle comprising a pair of driven wheels, wheel brakes for said wheels, means for operating said wheel brakes, mechanism for differentially driving said wheels, a driving motor, means driven by said driving motor for driving said differential mechanism, an overrunning clutch interposed between said driven means and said driving motor, means for braking said wheels through said differential mechanism independently of said wheel brakes, and means for operating said means for braking said wheels independently of said wheel brakes, simultaneously with the operation of said wheel brakes, said differential mechanism embodying means to prevent one of said wheels from rotating ahead of the other of said wheels during momentary unequal retarding action of said brakes on said wheel, whereby to prevent skidding of said vehicle upon sudden uneven application of said wheel brakes.

WILLARD F. ROCKWELL.
HERBERT W. ALDEN.